United States Patent

[11] 3,583,686

| [72] | Inventor | Elliott M. Mackey<br>11945 S. Ridgeway, Alsip, Ill. 60658 |
|---|---|---|
| [21] | Appl. No. | 832,076 |
| [22] | Filed | June 11, 1969 |
| [45] | Patented | June 8, 1971 |

[54] VEHICLE DRYER
6 Claims, 1 Drawing Fig.

[52] U.S. Cl. .................................................. 263/2,
34/105, 263/19
[51] Int. Cl. ..................................................... F26b 25/08,
F27b 9/00
[50] Field of Search ........................................... 263/2, 19
A, 190, 19; 34/105

[56] References Cited
UNITED STATES PATENTS

| 2,538,953 | 1/1951 | Yates et al. ................... | 263/19 |
| 2,874,485 | 2/1959 | Wilson ......................... | 34/105X |
| 2,949,678 | 8/1960 | Anderson ..................... | 34/105 |

Primary Examiner—John J. Camby
Attorney—Fidler, Bradley & Patnaude

ABSTRACT: A jet engine in an underground room beneath an automobile wash station draws dry air from an intake conduit that extends above ground outside of the automobile wash station, a portion of the air being used to oxidize natural gas in the combustion chambers of the jet engine for the purpose of creating a forceful flow of hot gases and another portion of the air being directed around the combustion chambers to mix with the hot gases. The mixture of gases is forced through a conduit upward to the automobile wash station and through apertures in a drying station for the automobile near the exit of the automobile wash station.

PATENTED JUN 8 1971
3,583,686
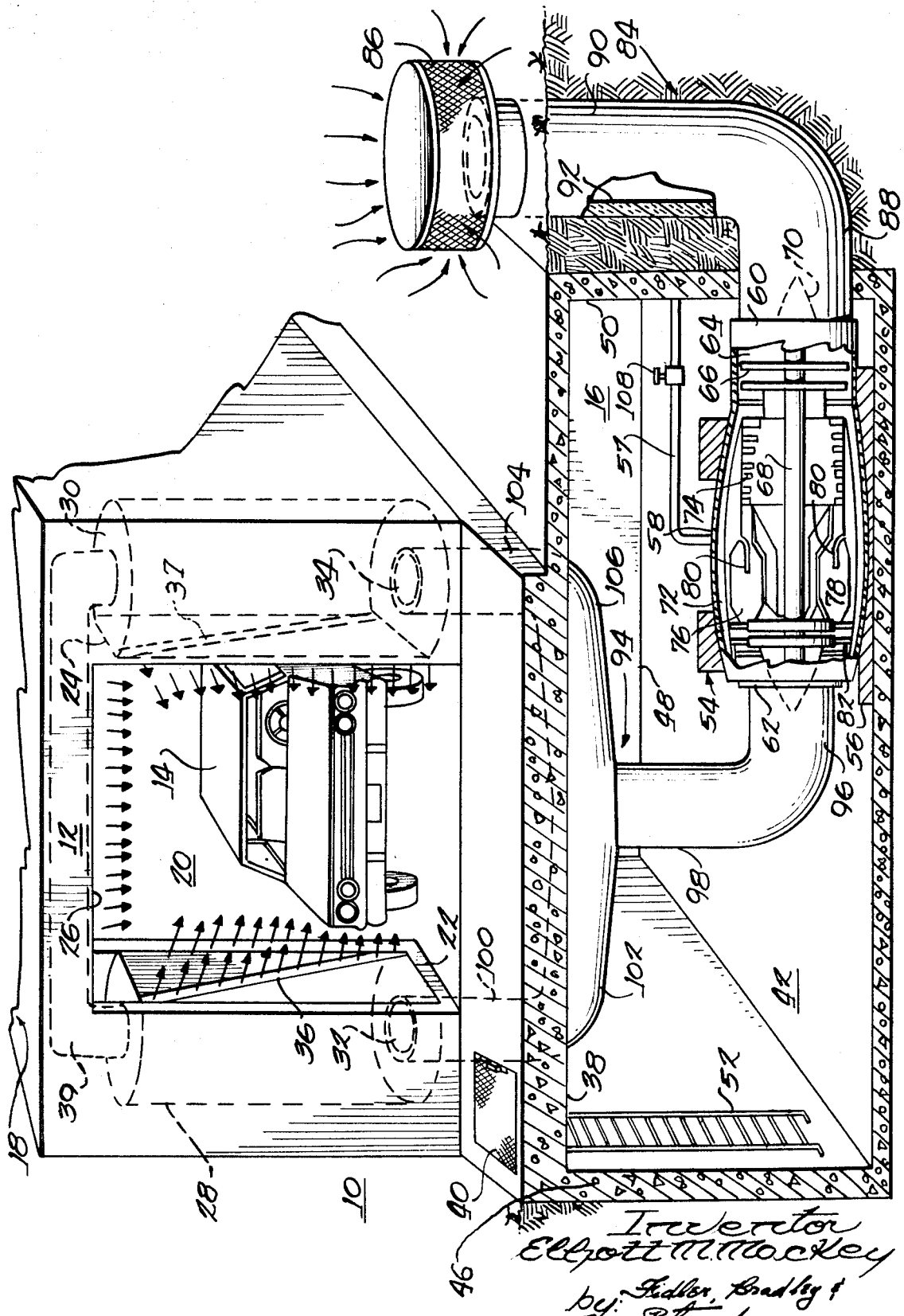
Inventor
Elliott M. Mackey
by Sidler, Bradley &
Patnaude Attys

VEHICLE DRYER

This invention relates to vehicle-drying apparatus and more particularly to apparatus for blowing warm gases upon vehicles to dry them after they have been washed.

One type of prior art gas dryer for vehicles includes electric heaters to heat air and electric blowers to impel the heated air against a vehicle emerging from a vehicle wash station. Another type of prior art gas dryer includes gas burners for heating air and electric blowers which impel the heated air and products of combustion upon the vehicle to dry it.

The prior art gas dryers have a disadvantage in that they are expensive.

Accordingly, it is an object of this invention to provide a novel dryer.

It is a further object of this invention to provide a novel apparatus for forcing warm gases against a wet object to dry the object.

It is a still further object of this invention to provide an inexpensive apparatus for heating gases and forcing them upon a wet vehicle to dry the vehicle after it has been washed.

In accordance with the above and further objects of the invention, the vehicle drying apparatus includes a drying station positioned near the end of a vehicle wash station and an underground engine room. In the underground engine room, is a jet engine of the turbojet or fan jet type, which includes at least one compressor stage that forces one portion of the air into the combustion chambers of the jet engine and another portion of the air around the combustion chambers to later be mixed with the products of combustion as they leave the combustion chambers.

This type of jet engine provides a high volume of warm gases at its exhaust orifice, which warm gases are sufficiently cool to be used in a vehicle drying station because the products of combustion formed in the combustion chambers are mixed with cooler air passing around the combustion chamber to cool the resulting gas to a suitable temperature for drying. The air intake system for the jet engine includes ductwork that extends from the jet engine in the underground engine room to a point above the surface of the ground near the vehicle wash station but far enough away so that it draws dry air downward to the jet engine rather than moist air. The gas output from the jet engine is guided by ductwork to the drying stations at the exit of the vehicle wash station where it is impelled against vehicles leaving the vehicle wash station to dry them.

The use of a single jet engine both to heat the gases and to force them against the vehicle causes this type of apparatus to be less expensive than the prior art apparatuses which require separate heaters and blowers to force heated gases against the vehicle. The proper temperature is obtainable from the fan jet or turbojet type of jet engines. The noise from these engines is prevented from causing a disturbance by locating the engine room beneath the ground and by using sound insulation on the ductwork.

The invention and the above noted and other features thereof will be better understood from the following detailed description when considered with reference to the accompanying drawing. The drawing is a fragmentary perspective view of a vehicle wash station partly broken away to show the engine room and jet engine used in the vehicle drying apparatus.

STRUCTURE OF THE VEHICLE DRYER

In the drawing, a vehicle drying apparatus 10 is shown comprising a drying station 12, a vehicle wash station 18 and an engine room 16 located underground beneath the drying station 12 and connected thereto by ductwork through which the warm gases formed in the engine room are transported to the drying station 12. The drying station 12 is located at the exit of the vehicle wash station 18 to receive washed vehicles such as the automobile 14 includes a passageway 20 formed with sidewall portions 22 and 24 and a top portion 26. The passageway 20 is large enough to permit vehicles such as the automobile shown at 14 to pass through as they leave the vehicle washing station 18.

Within the sidewall portion 22 is a first drying tower 28 and within the sidewall portion 24 is a second drying tower 30. The drying towers 28 and 30 are cylindrical metal tanks each having its base located contiguous with the floor of the drying station 12. Inlet orifices 32 and 34 are centrally located in the bottoms of the towers 28 and 30 respectively.

To permit hot compressed air within the drying towers 28 and 30 to impinge upon vehicles such as the automobile 14 within the passageway 20 in the drying station 12, the drying towers 28 and 30 include orifices 36 and 37, each opening towards the passageway 20. In the preferred embodiment the orifices 36 and 37 are longitudinal slots in the drying towers 28 and 30 extending diagonally from the top of the drying towers towards the bottom of the towers and facing the passageway 20 so that the hot gas leaving the orifices sweeps across the automobile 14 as it leaves the drying station 12. Ductwork 39 within the top portion 26 of the passageway 20 connects the drying towers 28 and 30 and includes a longitudinal orifice opening towards the passageway 20 so that the hot gas sweeps across the top of the automobile 14 as it leaves the drying station 12. With this arrangement, warm air is forced against the vehicle 14 from both sides and the top at a high velocity across its entire surface after it leaves the washing station 18 and before it passes completely through the exit passageway 20.

Beneath the drying station 12, is the engine room 16 having a roof 38 with a trap door 40 therethrough, a floor 42 and four sidewalls, three of which 46, 48, and 50 are shown in the drawing. A step ladder 52 extends along the wall 46 from the trap door 40 towards the floor 42 so that persons may open the trap door and reach the floor 42 with the aid of the ladder.

A jet engine 54 is mounted to a concrete support 56 within the engine room 16 and has a conduit 57 connected to it to supply it with fuel. A suitable fuel is natural gas either from the local municipal source of natural gas or from a container of bottled gas. The jet engine 54 is a two stage turbojet engine having a tubular outer casing 58 with a tubular air intake orifice 60 at one end and a hot gas exhaust orifice 62 at its opposite end. Within the tubular casing 58 near the air intake orifice 60, is the first compressor stage 64 which includes propellers 66 mounted to an axial shaft 68 that extends along the longitudinal axis of the jet engine within a longitudinally extending airfoil 70. This first compressor stage is a low-pressure stage and impels the air passing through the air intake orifice along two paths, which are: (1) an outer air flow path through the tubular outer passageway 72 to the exhaust orifice 62, and (2) a high compression path through the tubular high-pressure compressor 74 which is formed about the central airfoil 70 around the axial shaft 68 to the combustion chambers 76 near the exhaust orifice 62.

Hot expanded gases are formed in each of a plurality of combustion chambers 76 that are spaced around the inside of the tubular casing 58 and separated therefrom by the outer airflow passageway 72. The combustion chambers 76 receive air from the second compressor stage through inlets 78 and receive natural gas through the gas jets 80 for burning. The burning of the gas from the gas jets 80 creates the heat and combustion products that flow through the exhaust orifice 62.

As the products of combustion pass through the exhaust orifice 62, they rotate the propellers 82 which are mounted to the axial shaft 68. The rotation of the propellers 82 rotates the axial shaft 68 to which they are attached and the rotation of the shaft 68 rotates the propellers 66 which force the air from the intake orifice through the outer airflow passageway 72 and through the high-pressure compressor 74. At the exhaust orifice 62 the hot combustion products from the combustion chambers 76 and the air flowing through the outer passageway 42 are mixed together so that the resulting gas is lower in temperature and velocity.

To supply dry air to the intake orifice 60 for the jet engine 54, an air intake ductwork 84 is provided having an inlet duct 86 extending above ground outside of the vehicle wash station 18 to receive dry air, a horizontal duct 88 extending between the inner wall 50 and the air intake orifice 60 of the jet engine 54 within the engine room 16, and a vertical connecting duct 90 connecting the inlet duct 86 with the horizontal duct 88. The inlet duct 86, the vertical connecting duct 90, and the horizontal duct 88 each comprise a metal pipe coated on its inner surface with a sound proofing material 92 for the purpose of reducing the aboveground sound from the jet engine 54.

To guide the hot compressed air from the outlet orifice 62 of the jet engine 54 into the drying towers 28 and 30, ductwork is provided from the exhaust orifice 62 of the jet engine 54 to the inlets 32 and 34 of the drying towers 28 and 30. The ductwork includes a T-duct 94 with a first section of horizontal metal ductwork 96 extending between and communicating with a first vertical branch 98 of the T-duct and the exhaust orifice 62 of the jet engine, with a second section of vertical duct 100 extending between and communicating with a second branch 102 of the T-duct and the inlet 32 of the first drying tower 28, and with a third section of vertical duct 104 extending between and communicating with the third branch 106 of the T-duct and the inlet 34 of the second drying tank 30.

OPERATION OF THE VEHICLE DRYER

To operate the vehicle drying apparatus, the jet engine 54 is started and the gas flames in the combustion chambers are turned down to a low flame by means of the valve 108 in the natural gas pipe 57 for the throttling condition which supplies low-pressure warm gas to the drying towers 28 and 30. When it is desired to supply a heavy flow of warm gas to the drying towers 28 and 30, the gas flame is increased by increasing the natural gas flow to the jets 80. The flow of natural gas is increased by further opening the valve 108 in the natural gas line 57.

While the jet engine 54 is operated at its full thrust, an automobile 14 is driven into the passageway 20 of the drying station 12 and warm gases flow out of the elongated apertures 36 and 37 from the drying towers 28 and 30 onto the automobile 14 to dry it. With some types of jet engines, approximately 25,000 cubic feet per minute of gas flow are supplied through these apertures onto the automobile.

While the jet engine 54 is operating, dry fresh air is drawn through the inlet duct 86 of the air intake ductwork 84, downward underneath the ground through the vertical duct 90 and the horizontal connecting duct 88 into the air intake orifice 60 of the jet engine 54. The air flowing into the air intake orifice 60 is driven by the propeller system of the low-pressure compressor 64 so that a portion of it flows through the outer airflow passageway 72 to the exhaust orifice 62 of the jet engine 54 and another portion flows through the high compression section 74 of the jet engine 54. From the high compression section 74 of the jet engine, the compressed air flows into the combustion chambers 76 where it oxidizes natural gas, and is combined with the products of combustion from the burning of natural gas flowing through the gas jets 80. The heated and expanded air and products of combustion then pass through the turbine section which drives the shaft 68 to turn the propellers of the low-pressure compressor 64. From the turbine the gas flows through the exhaust orifice 62 to be mixed with the cooler air flowing through the outer air passage 72. The mixture of the cooler air from the outer airflow passage 72, the hot air, and the products of combustion from the combustion chambers 76 together form a warm, high-pressure stream of gas that flows through the horizontal duct 96 into the T-duct 94 and from there to the two drying towers 28 and 30 through the ducts 100 and 104 respectively.

It can be understood from the above description that the air-drying apparatus described herein is economical. It does not require the expensive blower systems and separate heating systems of the prior art dryers because the jet engine serves as an inexpensive substitute for both the blowers and heaters of the prior art systems.

Although an embodiment of the invention has been described with particularity, many modifications and variations are possible in the embodiment in the light of the above teachings. It is therefore to be understood that, within the scope of the appended claims, the invention may be practiced otherwise than as specifically described. cm I claim:

1. Drying apparatus comprising:
    a jet engine having an air intake orifice and an exhaust orifice;
    said jet engine being firmly mounted to a stationary base and adapted to draw fresh air through said intake orifice and expel hot gases under pressure through said exhaust orifice;
    a first means for directing said hot gases upon an object to be dried;
    second means for guiding said hot gases from the exhaust orifice of said jet engine to said first means;
    an underground compartment;
    an aboveground building having a passageway for objects to be dried;
    said first means being mounted adjacent to said passageway, whereby hot air is impelled upon said object to be dried from said first means while it is in said passageway; and
    said jet engine being mounted in said underground compartment, whereby noise from the operation of said jet engine is reduced before reaching the surface.

2. Drying apparatus according to claim 1 further including:
    an air intake system extending between the air intake orifice of said jet engine and a location aboveground remote from said drying apparatus;
    said air intake system including ductwork having soundproofing material on it permitting the communication of the air intake of said jet engine with the atmosphere aboveground.

3. Drying apparatus according to claim 2 in which said jet engine includes:
    a propeller section for driving air through said jet engine;
    a combustion chamber;
    a first passageway leading from said air intake orifice to said exhaust orifice whereby air is conveyed from said intake orifice to said exhaust orifice without passing through the combustion chamber;
    a second passageway;
    said second passageway leading from said air intake orifice to said combustion chamber whereby air is guided from said air intake orifice to said combustion chamber;
    a third passageway from said combustion chamber to the exhaust orifice of said jet engine for guiding heated gases from said combustion chamber to the exhaust orifice of said jet engine, whereby said heated gases are mixed with said air from said first passageway to provide a flow of compressed gases at a temperature less than that of the gases passing through said third passageway.

4. Drying apparatus according to claim 3 in which said first means includes at least one drying tower having at least one aperture therein, which aperture opens into said passageway and in which said second means includes ductwork for conveying heated gases from the outlet of said jet engine to said drying tower.

5. Drying apparatus according to claim 4 in which said drying tower is positioned adjacent to the exit of a vehicle wash station.

6. Drying apparatus comprising:
    a jet engine having an air intake orifice and an exhaust orifice;
    said jet engine being firmly mounted to a stationary base and adapted to draw fresh air through said intake orifice and expel hot gases under pressure through said exhaust orifice;

a first means for directing said hot gases upon an object to be dried;

second means for guiding said hot gases from the exhaust orifice of said jet engine to said first means;

said first means includes first and second drying towers;

said first and second drying towers being spaced apart to define a passageway through which a vehicle to be dried may pass upon leaving a vehicle wash station;

each of said first and second drying towers including at least one aperture opening into said passageway, whereby hot gases flow through said aperture from said drying station onto a vehicle in said passageway;

said jet engine including an air intake orifice and an exhaust orifice;

said jet engine including a plurality of propellers for drawing air into said air intake orifice and a turbine section driven by gases flowing through said exhaust orifice to rotate said plurality of propellers;

a first passageway extending between said air intake orifice and said exhaust orifice through which air is forced by said propellers;

a second passageway positioned to receive air from said air intake orifice;

a combustion chamber between said second air passageway and said turbine section for burning fuel and air from said second passageway and expelling hot gases through said turbine section;

said turbine section communicating with the exhaust orifice, whereby the hot gases from said turbine section are mixed with air passing through said first passageway to provide a flow of gases under pressure at a lower temperature than the gases leaving said combustion chamber;

said second means including ductwork communicating with said exhaust orifice of said jet engine and with said first and second drying towers;

said air drying apparatus including an underground compartment beneath said first means;

said jet engine being firmly mounted to a base in said underground compartment;

said drying apparatus including an air intake ductwork;

said air intake ductwork including a plurality of ducts extending between the air intake orifice of said jet engine and a location aboveground outside of said vehicle wash station, whereby dry air is provided to the air intake orifice of said jet engine.